United States Patent
Knapp

(10) Patent No.: US 6,613,261 B2
(45) Date of Patent: Sep. 2, 2003

(54) MOLDED PIPELINE PIG WITH HARDNESS VARIATIONS

(76) Inventor: Kenneth M. Knapp, 1209 Hardy St., Houston, TX (US) 77020

(*) Notice: Subject to any disclaimer, the term of this patent is extended or adjusted under 35 U.S.C. 154(b) by 0 days.

(21) Appl. No.: 09/945,991

(22) Filed: Sep. 4, 2001

(65) Prior Publication Data

US 2003/0041400 A1 Mar. 6, 2003

(51) Int. Cl.[7] ............................................. B32B 31/06
(52) U.S. Cl. .................... 264/250; 264/36.16; 264/261; 264/273
(58) Field of Search ................................. 264/261, 269, 264/274, 275, 36.16, 250, 273; 15/104.061; 425/460

(56) References Cited

U.S. PATENT DOCUMENTS

| | | | |
|---|---|---|---|
| 4,726,089 A | * | 2/1988 | Knapp |
| 5,265,303 A | * | 11/1993 | Neff |
| 5,457,841 A | | 10/1995 | Minton |
| 5,600,863 A | * | 2/1997 | Curran |
| 5,895,619 A | | 4/1999 | Knapp |
| 6,145,150 A | | 11/2000 | Knapp |

* cited by examiner

*Primary Examiner*—Mathieu D. Vargot
(74) *Attorney, Agent, or Firm*—Browning & Bushman P.C.

(57) ABSTRACT

A method of forming a pipeline pig in two or more steps is provided. Selected disks and/or cups, of selected size and hardness, are first formed. These disks and/or cups may include scraper disks, seal disks, flower petal disks, and/or cups in various sizes and hardnesses, in any desired permutation of these characteristics. The preformed pig components are then arranged with a plurality of mold pieces placed between the various disks and/or cups and then a second molding step is performed. The pig components which are formed in the first step preferably include a large central hole through which polyurethane will flow in the second molding step to form the mandrel. The pig components also preferably include a plurality of smaller holes radially spaced around the large central hole. The smaller holes serve to form a mechanically robust coupling between the pre-formed pig components and the polyurethane mandrel. Thus, the various pig components may be combined in any desired permutation of characteristics, so that a pig with desired working properties may be tailored to a specific task.

11 Claims, 3 Drawing Sheets

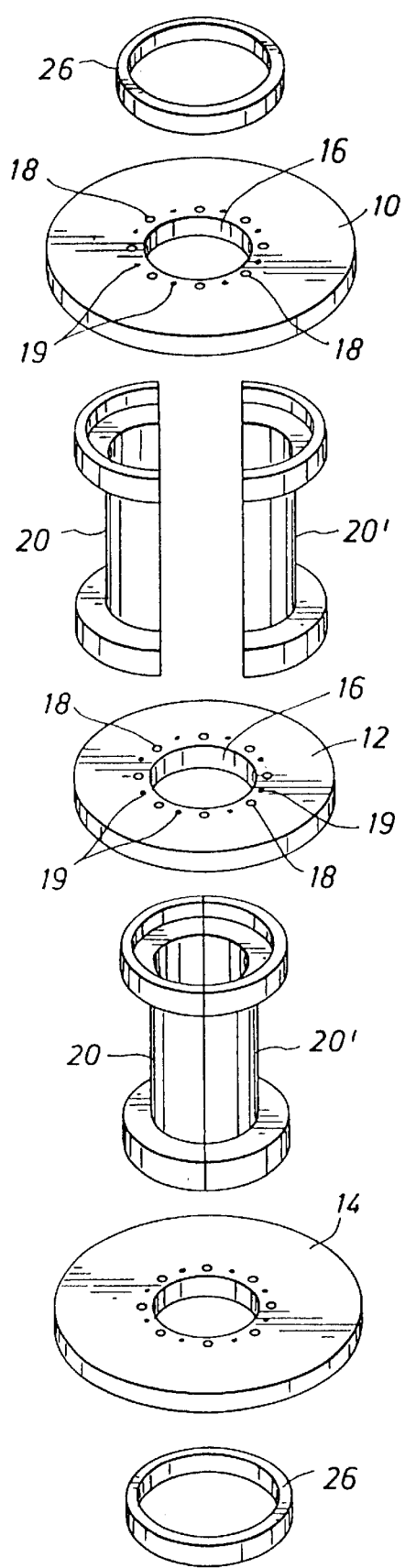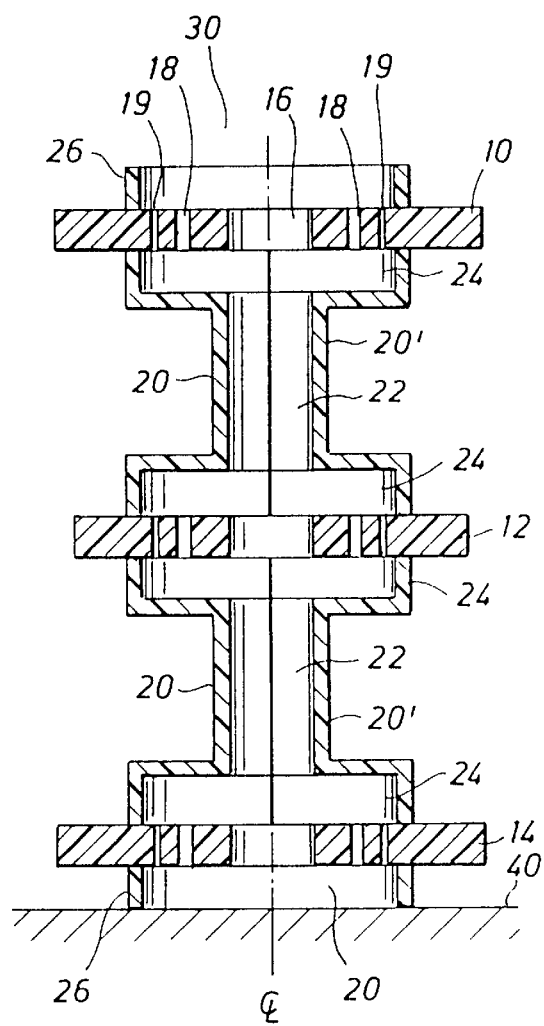

MOLDED PIPELINE PIG WITH HARDNESS VARIATIONS

FIELD OF THE INVENTION

The present invention relates generally to the field of pipeline pigs and, more particularly, to a molded pipeline pig having various components of different hardnesses or different configurations molded together in two or more molding steps. While the pig of this invention may be used for onshore pipelines, it was specially conceived for offshore oil pipeline applications wherein a non-metallic molded structure is mandated.

BACKGROUND OF THE INVENTION

The buildup of coatings such as paraffin on the interior of surface of a pipeline is a common problem in the oil industry. Paraffin buildup on the interior surface of the pipe restricts the flow capacity of the pipeline. Today, pipeline operators typically use a pig to remove such undesirable coatings from the interior of pipelines. A pig commonly comprises a metal body or mandrel that supports one or more flexible scraping disks, sealing disks, flower petal disks, and/or cups. The disks are ordinarily made of some type of rubber, polyurethane, or thin metal. These kinds of pigs work well in many applications, but unfortunately, if the metal mandrel pig suffers a catastrophic failure or comes apart while inside the pipeline, the metal fragments from the mandrel may become lodged in the wall of the pipeline or in valves or pipeline junctions, or they may damage downstream equipment such as pumps or sensors. Since such pigs are commonly bolted together from a number of individual parts, the bolts may come undone or fail, and for these and other reasons many critical applications require the use of non-metal pigs.

Pigs having a metal mandrel also have difficulty in traversing sharp bends in the pipeline. In sharp bends in the pipe, the rigid metal mandrel may prevent the pig from successfully navigating the bend. There are some metal mandrel pigs that have a universal joint in the mandrel that enables the pig to pass a bend. However, the universal joints add cost, and present another mechanism that is subject failure within the pipeline.

Completely non-metallic pigs eliminate these drawbacks. If a non-metallic pig breaks up inside the pipeline, the fragments of the pig ordinarily eventually degrade in the flowing fluid. Also, another pig may be sent through the pipeline to either destroy or dislodge the fragments. While the non-metallic pigs do not present the disadvantages associated with the metal mandrel pigs, they nevertheless present a further disadvantage that becomes readily apparent in pipelines of variable internal diameter.

To facilitate cleaning and maintenance, a pipeline should have a constant internal diameter. However, there are many circumstances where two sections of pipeline, each having a different internal diameter, are joined together, such as for example to form a "Y". In such circumstances, a pig having a given diameter maybe satisfactory to clean the interior of one of the pipeline sections, but not the other. For example, the cleaning disks and/or cups on the all-rubber pig may not be sufficiently flexible to enable the pig to readily move from a relatively larger diameter pipe section to a relatively smaller diameter pipe. Conversely, a pig that is effective in cleaning a smaller diameter pipe may not properly seal against the interior surface of the pipe as it passes into the larger diameter pipe. For pigs that do have sufficiently flexible cleaning disks, there is the further risk that, as the pig encounters a reduced internal diameter pipe section, and the disks are folded backward, buckling may occur. As the disks buckle, the peripheral surfaces of the disks will have a tendency to form folds and ripples. The buckling is a natural consequence of the overgauged disks being compressed into the undergauged internal diameter of the second section of pipe.

One solution to these problems was suggested by Minton in U.S. Pat. No. 5,457,841. In Minton, a non-metallic pipeline pig for cleaning a variable diameter pipeline comprises an elongated cylindrical body, front and back cups coupled to the body, and a plurality of generally circular wiping disks coupled to the body between the cups. Minton suggests that the disks and front and back cups could be molded as a single unit, or separately molded and later joined by a second molding process or by applying a suitable adhesive. How this is to be done is not at all clear from the description in Minton. The material from which the pig is formed is preferably polyurethane rubber with a durometer of between 60 and 80 inclusive. One drawback to the Minton pig, however, is that apparently no provision is made for one or more of the disks having one hardness, while one or more other disks have a different hardness. Thus, in using the Minton pig, for example, in a pipeline having a large section coupled to smaller section, the disks will bend back and therefore provide no scraping function, unless an abrasive is also used as disclosed in Minton.

Thus, there remains a need for a pipeline pig in which disks of different types, or disks of the same type but of different durometers, may be molded separately and then molded onto a polyurethane mandrel in a separate molding step. Further, there remains a need for a method of forming a pipeline pig which includes these features. The present invention is directed to just such a pipeline pig and to a method of making the pig.

SUMMARY OF THE INVENTION

The present invention solves these and other drawbacks in the art by providing a method of forming a pipeline pig in two or more steps. Selected disks and/or cups, of selected size and hardness, are first formed. These disks and/or cups may include scraper disks, seal disks, flower petal disks, and/or cups in various sizes and hardnesses, in any desired permutation of these characteristics. As used herein, the term "laterally extending pig component" or the term "radially extending pig component" refers to these and other components of a pipeline pig adapted to contact the inner surface of a pipe. The preformed pig components are then arranged with a plurality of mold pieces placed between the various disks and/or cups and then a second molding step is performed.

The pig components which are formed in the first step preferably include a large central hole through which polyurethane will flow in the second molding step to form the mandrel. The pig components also preferably include a plurality of smaller holes radially spaced around the large central hole. The smaller holes serve to form a mechanically robust coupling between the pre-formed pig components and the polyurethane mandrel. Thus, the various pig components maybe combined in any desired permutation of characteristics, so that a pig with desired working properties may be tailored to a specific task.

These and other features and advantages of the present invention will be apparent to those skilled in the art from a review of the following detailed description along with the accompanying drawings.

BRIEF DESCRIPTION OF THE DRAWINGS

FIG. 1 is an exploded view of the various components used in carrying out the method of the invention.

FIG. 2 is a side section view of two disks for a pig with a two-piece mold in between them to illustrate the construction of a pig.

DETAILED DESCRIPTION OF THE PREFERRED EMBODIMENT

Components For Making a Pig

Figure 3:
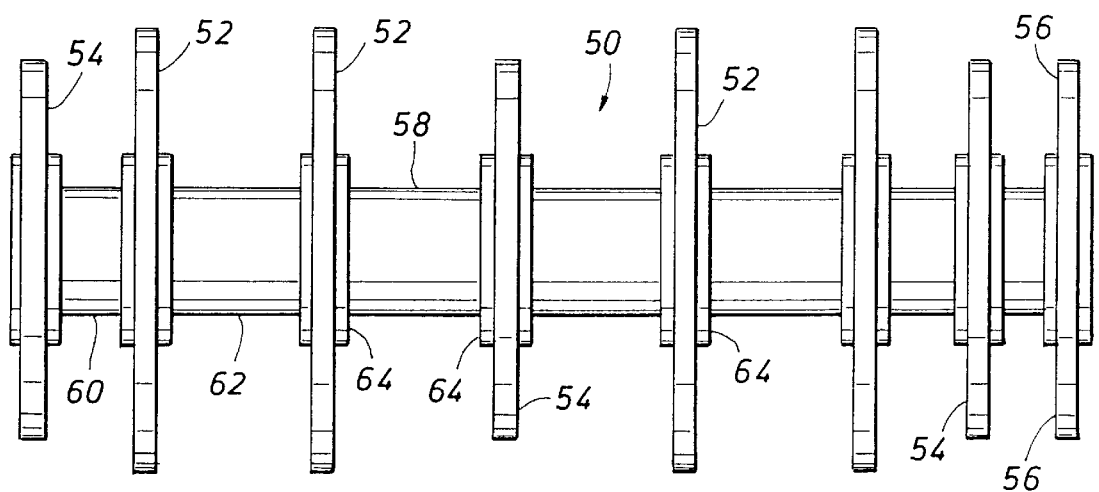
FIGS. 3 through 7 are a side views of various pipeline pigs constructed in accordance with the invention.

FIG. 1 illustrates the setup of various components used to practice the invention, shown as an exploded view. A first disk 10 is formed, preferably by molding, of a first selected hardness and having a selected diameter and thickness. A second disk 12 is also formed, also preferably by molding, and the second disk 12 may have the same hardness and dimensions as the first disk 10, or the hardness and/or dimensions may be different than those of the disk 10. It is to be understood that more disks, or other selected pig components, such as a disk 14 or other components, may also be included in the construction as desired.

The disks 10 and 12 include a large central opening 16 through which liquid polyurethane will be poured as the construction of the pig continues. The disks 10 and 12 also include a plurality of radially disbursed through-holes 18 which also provide a flow path for liquid polyurethane, and provide mechanical rigidity and robustness to the construction. A plurality of holes 19 are also provided as vent holes to release any trapped air when the pig is formed in the second molding step of the invention. These features of the invention are shown also in FIG. 2.

In between the pre-formed disks 10 and 12 is a split mold 20, 20'. Another such mold may be placed below the disk 12, and more disks or other pig components and more molds until the desired pig configuration is defined. The mold 20, 20' includes a central cylindrical section 22 which ultimately will form the mandrel of the pig. At each end of the central cylindrical section 22 is a flange forming cylindrical section 24, which forms a flange against the preformed disk which is positioned adjacent the mold.

The assemblage also includes end flange forming ring molds 26. In the example of FIG. 1, one such ring mold 26 is placed below the disk 14 to define a flange forming chamber 28, and another such ring mold is placed on top of the disk 10 to define a flange forming chamber 30, thereby forming a flange end on each end of the pig.

It should now be apparent that the disks can be selected in respect of size and hardness to suit a particular pipeline application. It is important that the flange forming cylindrical section 24 have a diameter sufficiently large so as to extend outside the flow through holes 18 and the vent holes 19. It is also important that the molds and the pre-formed pig components be axially aligned for radial symmetry of the pig. Otherwise, the components can be arranged as desired, and the hardnesses of the pig components can be selected depending on the desired function, and these can differ from the hardness of the mandrel itself.

The Method of Making a Pig

Now that the components for forming a pig in accordance with this invention have been described, the method of forming a pig using these components simply becomes a matter of placing the components in proper relation to one another and pouring the polyurethane into the mold in the second step. This process begins with the placement of a ring mold 26 on a support surface 40 such as a mold table well known in the art. In the example of FIGS. 1 and 2, the disk 14 is then placed on top of the ring mold 26 and aligned so that the axis of the disk coincides with the axis of the ring mold. A mandrel forming split mold 20, 20' is then aligned on top of the disk 14, and further disks and molds are stacked up until the desired pig is defined, concluding with a ring mold 26. The pre-formed disks are preferably aligned in place with a carpenter's square, or any appropriate device, or simply measured into proper axial alignment. The entire stack of pig components and molds is then clamped securely, and molten polyurethane rubber is poured down through the stack. The molten polyurethane flows down to the bottom of the stack, filling the flow through holes 18 to securely retain the disks, and down through the larger diameter hole 16 in the center of the stack to form the mandrel. The entire stack is then cured at an appropriate temperature for a sufficient time to set the material. The molds are then removed, and the pig is ready for deployment.

Examples of Pigs Made Using the Invention

FIGS. 3 through 7 illustrate examples of pigs which were made in accordance with the method just described. FIG. 3 is a bi-directional and multi-dimensional pig 50 comprising a plurality of seal disks 52 and a plurality of scraping disks 54. The pig may also include a leading scraping disk 56 that has a slightly smaller radius than the adjacent scraping disk 54. Each of the disks 52, 54, and 56 may be pre-formed of a selected hardness, thickness, and diameter, as previously described. The disks are joined together in a second molding step, which step also forms a mandrel 58. Note that the axial length of the mandrel between adjacent disks may also be tailored to a specific need, as shown in the different length of a mandrel segment 60 compared to the length of an adjacent mandrel segment 62. This is accomplished easily by selecting the height of the mold 20, 20', as shown in FIGS. 1 and 2. Note also that each of the disks has formed adjacent thereto a flange 64 on either side of the disk as previously described. The hardness of the mandrel may also be different than the hardness of the disks, as desired.

Figure 4A:
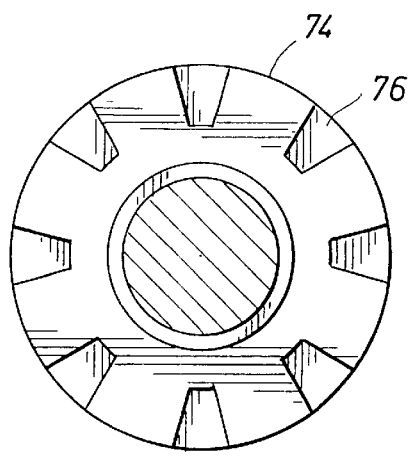
FIG. 4a is an end view of the pig of FIG. 4.
Figure 4:
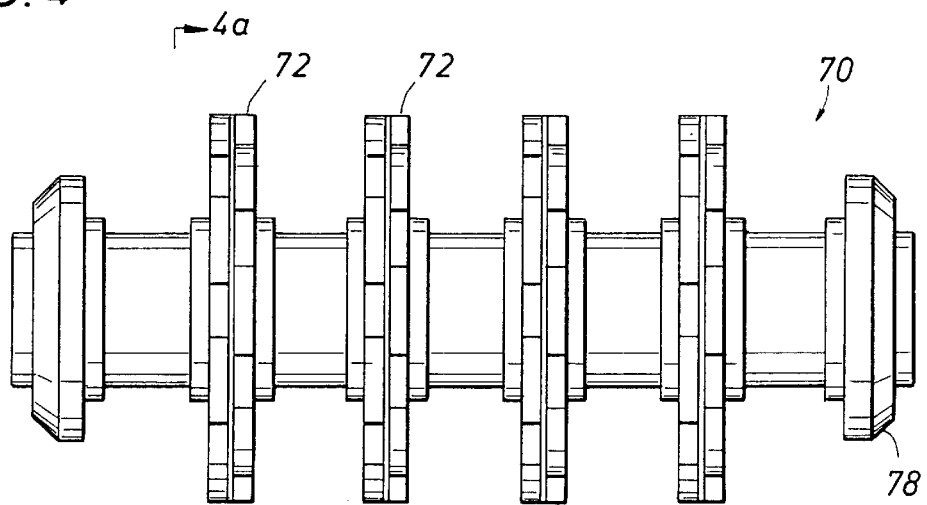

FIG. 4 depicts another configuration of a pig constructed in accordance with the invention. This pig is also a bi-directional, multi-dimensional pig 70. The pig 70 comprises a plurality of flower petal disks 72, disposed in pairs, each of which comprises circumferentially spaced arcuate sections 74 separated by circumferentially spaced openings 76, as shown in FIG. 4a. A pair of such disks are arranged such that an arcuate section of one is opposite an opening of an adjacent disk, and vice versa. A thin, solid disk is disposed between the disks of the pair, to form the flower petal disk 72. The disk 72 is then molded into the pig in the second molding step as previously described. The pig of FIG. 4 may also include a nose 78 which helps to move the pig through pipelines having check valves, for example.

Figure 5:
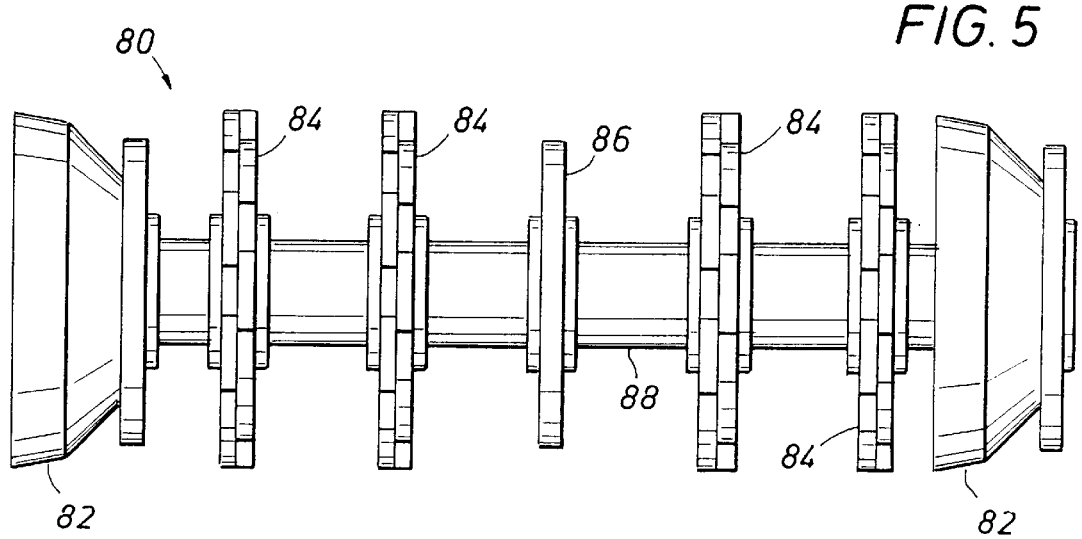

FIG. 5 further depicts the flexibility of the present invention, showing a pig 80 including cups 82, flower petal disks 84, and a wiping or scraping disk 86. As previously described, the laterally extending pig components, including the cups 82, the flower petal disks 84, and the wiping or scraping disk 86 are molded first, including the holes 16, 18, and 19, and then molded to a mandrel 88 in a second molding step.

Figure 6:
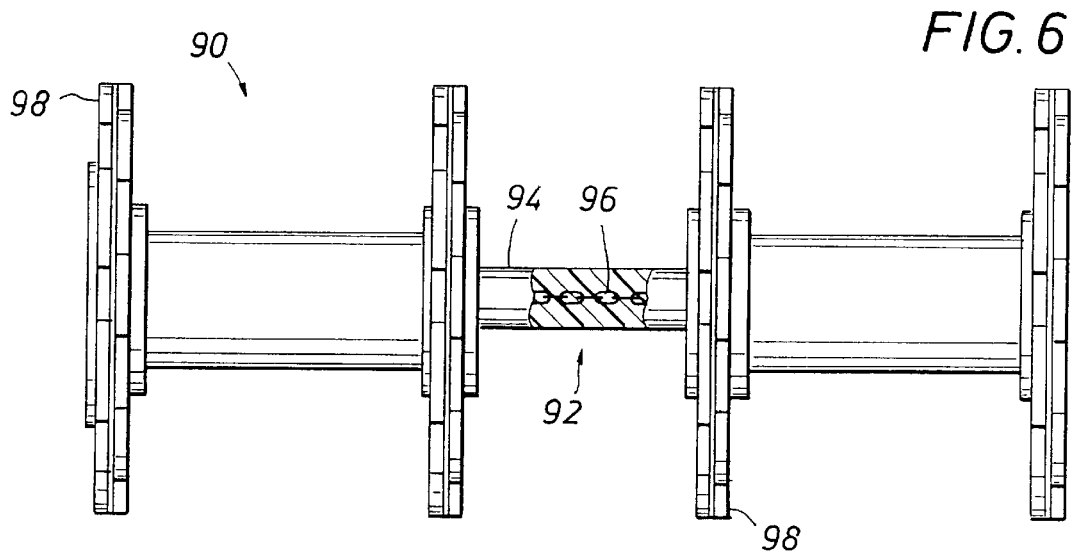

FIG. 6 illustrates a multi-dimensional pig 90 with a center flex coupler 92 comprising a reduced diameter mandrel section 94. The mandrel section 94 maybe subjected to certain tensile stresses during deployment and operation of the pig, so a flexible metal chain 96, cable, or other stress-absorbing device maybe embedded into the mandrel section 94 during the second fabrication molding step. In this example, the pig 90 includes a plurality of flower petal disks 98, or other laterally extending components.

Figure 7:
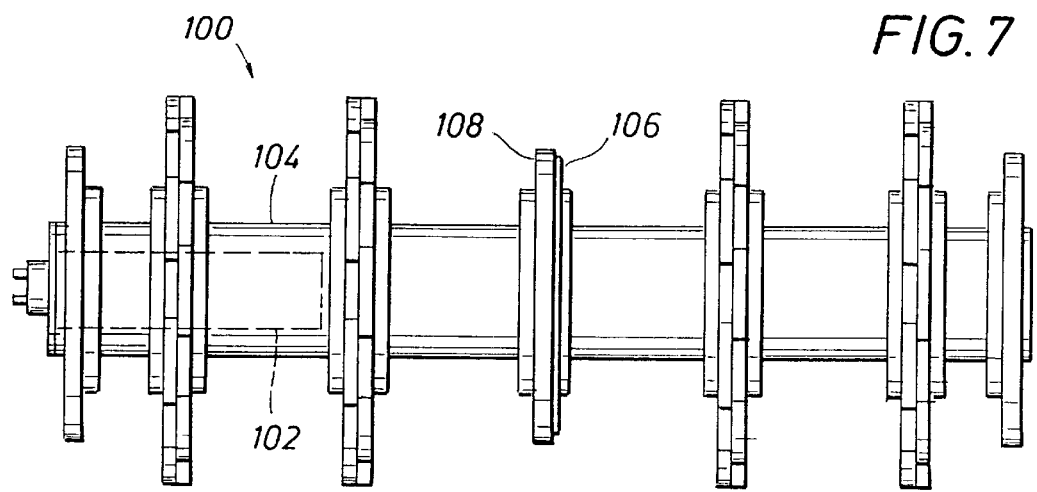

Finally, FIG. 7 shows yet another feature of the invention, wherein a pig 100 may include an acoustic pinger cavity 102. The cavity 102 is easily formed using the previously described technique by placing a housing 104 on the horizontal surface 40, then stacking the other elements called for in fabricating the pig, then completing the second molding step. The pig 100 may also include a gauge plate 106, preferably formed of a metal which is softer than the metal of the pipeline into which the pig is to be deployed. The gauge plate may be permitted in some applications because it is molded into the pig between a flange 108 and a preformed scraper disk 108 and cannot come loose from the pig unless the entire pig deteriorates.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A method of making a pig adapted to pass through a pipeline having an internal surface, the method comprising the steps of:
   a. molding a plurality of radially extending pipeline pig components in a first molding step;
   b. forming a plurality of mandrel segment forming molds, each of the mandrel segment forming molds having a central cylindrical section having a mandrel diameter, the central cylindrical section having a flange forming section at each end thereof, each of the flange forming sections defining a flange diameter larger than the mandrel diameter;
   c. placing a radially extending pipeline pig component between flange forming sections of adjacent mandrel segment forming molds; and
   d. then molding a mandrel in a second molding step, wherein the components are molded to the mandrel in the second molding step.

2. The method of claim 1, wherein the step of molding a plurality of components includes molding at least one first component of a first hardness and molding at least one second component of a second hardness.

3. The method of claim 1, wherein the step of molding a plurality of components includes molding at least one component of a first hardness and wherein the mandrel defines a second hardness.

4. The method of claim 1, wherein at least one of the plurality of components defines a scraping disk and at least one of the plurality of components defines a sealing disk.

5. The method of claim 1, wherein a first mandrel segment forming mold defines a first diameter and wherein a second mandrel segment forming mold defines a second diameter.

6. The method of claim 5, wherein the first mandrel segment forming mold defines a first length and wherein the second mandrel segment forming mold defines a second length.

7. The method of claim 5, further comprising the step of molding a stress absorbing element into the mandrel.

8. The method of claim 5, further comprising the step of molding an acoustic pinger cavity into the mandrel.

9. The method of claim 1, wherein the step of molding the plurality of components includes the step of molding a central hole in each of the plurality of components.

10. The method of claim 9, wherein the step of molding the plurality of components includes the step of molding a plurality of through holes radially dispersed around the central hole.

11. The method of claim 10, wherein the step of molding the plurality of components includes the step of molding a plurality of vent holes radially dispersed around the central hole.

* * * * *